United States Patent [19]

Hayashi et al.

[11] Patent Number: 4,929,171
[45] Date of Patent: May 29, 1990

[54] COMPOSITE POLYVINYLCHLORIDE PLASTISOL COATING AND METHOD OF APPLYING IT TO A METAL SHEET

[75] Inventors: Yoshio Hayashi; Tetsuo Nakamoto; Katsumi Kanada; Yoshikazu Kondo, all of Yamaguchi, Japan

[73] Assignee: Toyo Kahan Co., Ltd., Japan

[21] Appl. No.: 275,567

[22] Filed: Nov. 22, 1988

[51] Int. Cl.$^5$ .............................................. B05D 3/06
[52] U.S. Cl. ................................ 427/54.1; 427/388.1; 427/388.2; 522/79; 522/109; 525/193
[58] Field of Search .................. 427/44, 54.1, 388.1, 427/388.2; 522/79, 109; 525/193

[56] References Cited

U.S. PATENT DOCUMENTS 4,465,572 8/1984 Graham ............................ 522/79 X
4,634,562 1/1987 Downey ........................... 522/79 X Primary Examiner—Michael Lusignan

[57] ABSTRACT

A method of applying an composite polyvinylchloride plastisol coating to a metal sheet and the composite polyvinylchloride coating thereof, which coating is characterized by having high hardness and excellent impression resistance, bleed resistance and formability, wherein the sheet is coated with a composite plastisol composition essentially consisting of a specific polyvinylchloride powder, an acrylic resin powder and an acrylic monomer and/or oligomer. Said method of applying the composite polyvinylchloride plastisol coating to a metal sheet, in certain instances, involving curing the coated sheet metal with ultraviolet rays after heating and embossing the coating. Also provided herewith is a polyvinylchloride plastisol used in such method.

11 Claims, 1 Drawing Sheet

COMPOSITE POLYVINYLCHLORIDE PLASTISOL COATING AND METHOD OF APPLYING IT TO A METAL SHEET

BACKGROUND OF THE INVENTION

1. Field of the Invention

The present invention relates to a method of applying a composite polyvinylchloride plastisol coating to a metal sheet to produce a coating having high hardness and excellent impression resistance, bleed resistance and formability. The invention also relates to polyvinylchloride plastisols used in such method.

2. Description of the Prior Art

Polyvinylchloride plastisol coatings for metal sheets are widely applied for various uses because of the coatings' superior formability, corrosion resistance, weatherability and capability of producing surface designs by embossing. However, conventional polyvinylchloride plastisol coatings for metal sheets have an inferior impression resistance and bleed resistance because of the softness of the coating. Therefore, the conventional polyvinylchloride plastisol coatings are easily deformed when the coated metal sheets are piled up in stacks, causing impressions to be formed in the embossed patterns of the coatings as well as bleeding of the coatings.

To improve upon the above-mentioned drawbacks of conventional polyvinylchloride plastisol coatings, the polyvinylchloride powders, plasticizers and diluents incorporated in the polyvinylchloride plastisols have been examined to obtain a harder coating, however, the improvements have been limited.

In the prior art, there are known methods relating to improvements of the above-mentioned drawbacks of polyvinylchloride plastisol coatings, for example, Japanese Patent Application Laid-Open No. Sho. 54-50549 and Japanese Patent Application Laid-Open No. Sho. 63-185630. However, the present invention is different from these inventions with regard to the components of the plastisol.

Japanese Patent Application Laid-Open No. Sho. 54-50549 relates to a polyvinylchloride plastisol coating for metal sheets having high hardness and superior bleed resistance, stain resistance and solvent resistance. The reference discloses a composite plastisol consisting of a conventional polyvinylchloride powder, reactive plasticizer and conventional plasticizer which is coated on a metal sheet and heated, and, in certain instances, is irradiated by ultraviolet rays. However, the hardness, impression resistance and bleed resistance of the coating are not completely satisfactory.

Japanese Patent Application Laid-Open No. Sho. 63-185630 also relates to a polyvinylchloride plastisol coating for metal sheets. This reference discloses a composite plastisol consisting of a specific polyvinylchloride powder and an acrylic resin powder which is coated on a metal sheet and heated. The present invention is different from this invention with regard to the materials used in the plastisol and with regard to the hardness, impression resistance and bleed resistance of the coating.

BRIEF SUMMARY OF THE INVENTION

The present invention thus provides a composite polyvinylchloride coating for a metal sheet which coating has high hardness, excellent impression resistance and excellent bleed resistance.

More specifically, the present invention provides a metal sheet covered with a composite plastisol comprising a specific polyvinylchloride powder having particle sizes which give 2 peaks in a distribution curve, an acrylic resin powder and an acrylic monomer and/or oligomer. In certain instances, the coated metal sheet is irradiated by ultraviolet rays after heating and embossing the coating.

DETAILED DESCRIPTION OF THE INVENTION

The present invention will be described below in more detail.

We shall begin with the composite polyvinylchloride plastisol coating.

The composite plastisol coating composition comprises a polyvinylchloride resin powder, an acrylic resin powder, an acrylic monomer and/or oligomer, a plasticizer, a stabilizer, and a heat setting initiator and a photoinitiator for the acrylic monomer and/or oligomer. The coating composition may also include agents such as pigments, fillers, etc.

Polyvinylchloride resin, which is one of the main components of the present invention, may include that which is polymerized by micro suspension, emulsion or solution methods. The resin should have an average degree of polymerization of 500 to 2,500 (i.e. the number of repeating monomeric units), and may include homopolymers, copolymers and partially cross-linked polymers. The monomers used for copolymerization with vinylchloride monomers are, for example, ethylene, propylene, vinyl acetate, vinyl propionate, vinyl stearate, alkyl vinyl ether, vinylidene chloride, di-ethyl fumarate and methacrylate. More than 95 wt % of the polyvinylchloride powder should be composed of particles whose sizes are in the range of 0.5 to 40 $\mu$m. Of that, 20 to 60 wt % should be particles whose sizes are in the range of 0.5 to 5 $\mu$m and 35 to 75 wt % should be particles whose sizes are in the range of 5 to 40 $\mu$m. The distribution curve corresponding to particle size should have 2 peaks in the 1 to 3 $\mu$m range and in the 8 to 15 $\mu$m range, respectively.

Figure 1:
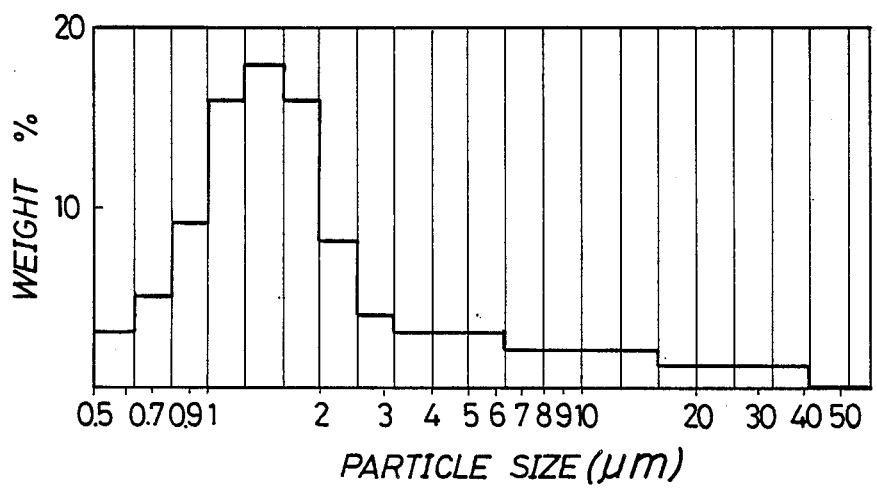
FIG. 1 average particle size of the conventional polyvinylchloride power for a plastisol coating.
Figure 2:
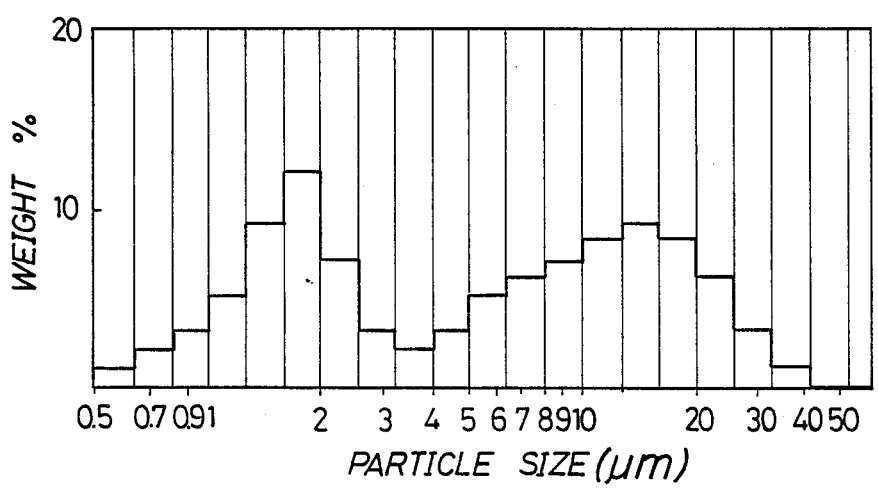
FIG. 2 average particle size of the claimed polyvinylchloride powder for a plastisol coating.

Although the average particle size of the conventional polyvinylchloride powder for a plastisol coating is 1 to 3 $\mu$m as shown in FIG. 1, the present inventors have found it desirable for the polyvinylchloride powder to be composed of particle sizes which give 2 peaks in the distribution curve as shown in FIG. 2. The present inventors have discovered that more than 5 wt % of polyvinylchloride powder having a particle size of more than 40 $\mu$m impairs the appearance of the coating surface. Less than 20 wt % of the polyvinylchloride powder having a particle size of 0.5 to 5 $\mu$m, or more than 75 wt % of the polyvinylchloride powder having a particle size of 5 to 40 $\mu$m is found to cause inferior gelation of the plastisol coating. On the other hand, more than 60 wt % of the polyvinylchloride powder having a particle size of 0.5 to 5 $\mu$m or less than 35 wt % of the polyvinylchloride powder having a particle size of 5 to 40 $\mu$m is found to cause high viscosity of the plastisol and thus requires great quantities of plasticizer or diluent to coat metal sheets and to impart softness to the coating.

Acrylic resin powder, which is another one of the main components according to the present invention, may include that which is polymerized by the micro suspension or emulsion methods, and may include homopolymers of methylmethacrylate, copolymers and partially cross-linked copolymers. The monomers used for copolymerization with methylmethacrylic acid are, for example, vinyl monomers having such functional groups as epoxy, carboxyl, methylol, alkyl amino and amido groups, and multifunctional compounds such as divinyl benzene, ethyleneglycol dimethacrylate and trimethylolpropane trimethacrylate monomers. In the present invention, acrylic resin powder having an average degree of polymerization of 500 to 30,000 is desirable. Acrylic resin polymers having an average degree of polymerization of less than 500 impair the formability of the coating, and polymers having an average degree of polymerizatior of more than 30,000 impair the gelation of the plastisol coating and cause brittleness of the coating. In these powders, a particle size of more than 0.1 $\mu$m and less than 40 $\mu$m is desirable. An acrylic resin particle size of more than 40 $\mu$m results in inferior gelation of the coating, and a particle size of less than 0.1 $\mu$m causes an high viscosity of the plastisol.

Acrylic monomers or oligomers, which are another main component according to the present invention, may be liquid chemicals having at least one kind of functional group in a molecule such as acryloyl, methacryloyl and vinyl, and may be polymerized by heating and irradiating with ultraviolet rays. Acrylic monomers which may be used in the present invention are, for example, 2-ethylhexyl acrylate, tetrahydrofurfuryl acrylate, neopentylglycol diacrylate, tri-methylolpropane triacrylate and pentaerytritol triacrylate. Acrylic oligomers which may be used in the present invention are, for example, polyol acrylate, polyesteracrylate, epoxy acrylate and urethane acrylate. A mixture of the above-mentioned acrylic monomers and oligomers may also be used in the present invention.

The heat setting initiator for acrylic monomers and oligomers may include several kinds of organic peroxides, and the photoinitiator for acrylic monomers and oligomers may include, for example, benzoin benzyl, benzoin ethylether and benzophenone. A mixture of the above-mentioned heat setting initiators and photoinitiators may also be used, and the amount should be 0.1 to 5 parts per 100 parts of the acrylic monomers and/or oligomers.

Plasticizers, stabilizers, pigments and other additives, which are additional components of the present invention, may include those used in conventional polyvinylchloride plastisol coatings.

The composition of the composite plastisol is as follows:

| | |
|---|---|
| polyvinylchloride powder | 100 parts |
| acrylic resin powder | 5 ~60 |
| acrylic monomer and/or oligomer | 5 ~60 |
| heat setting initiator | 0.05~3 |
| photoinitiator | 0.05~3 |
| plasticizer | as needed |
| stabilizer | as needed |
| pigment | as needed |
| diluent | as needed |

The above amounts and those amounts described in the specification refer to parts by weight, unless otherwise specified.

The amount of acrylic resin powder and acrylic monomer and/or oligomer must not be over 60 parts or under 5 parts of either component, because the addition of over 60 parts impairs the embossing finish, while the addition of less than 5 parts has no effect.

Next, the process for obtaining the coated metal sheets of the present invention will be described.

A steel sheet, an electrogalvanized steel sheet, a hot dip galvanized steel sheet or an electrolytic chromate treatment steel sheet, etc., are used as the substrate steel sheet. A well known adhesive for polyvinylchloride-metal coated steel, such as an acrylic-type, epoxy-type, urethane-type or a rubber-type, etc., is used as the adhesive. The substrate steel sheet is typically precoated with adhesive, baked by a heat treatment and covered with the composite polyvinylchloride plastisol of the present invention. The substrate steel sheet with adhesive is coated with this composite polyvinylchloride plastisol by roll coating, dipping, knife coating or curtain coating, etc., and then baked at 150° to 250° C. for gelation and adhesion, after which the embossing finish is applied. In certain instances, the coated metal sheet is irradiated by ultraviolet rays after the heating and embossing the coating. The wavelength of the ultraviolet rays may be 200 to 400 $\mu$m and the ultraviolet rays may be generated by a mercury lamp, a xenon electronic-flash lamp or a carbon arc lamp. The irradiation should be done after heating and embossing the coating, because irradiation done before heating and embossing the coating causes an inferior embossing surface.

The detailed effects of the present invention will be further explained by the following examples.

EXAMPLES

Example 1 was produced by the following procedure:

A Zn-Co-Mo coelectrogalvanized steel sheet of 0.5mm thickness was coated with an epoxy-type adhesive 5 $\mu$m in thickness by a bar coater and heated in a hot air oven for 30 seconds at 300° C. The temperature of the steel sheet was 230° C. Then the steel sheet was cooled. The steel sheet was then coated with the composite polyvinylchloride plastisol shown in Table 1 150 $\mu$m in thickness by a knife coater and heated in a hot air oven for 60 seconds at 260° C. and immediately thereupon received an embossing finish by an engraved pebbling roll having a roughness of 7.1 $\mu$m in average roughness and 45.0 $\mu$m in maximum roughness.

Examples 2–6 of the present invention were produced according to the same procedure as Example 1, except for the substitution of the composite polyvinylchloride plastisol compositions shown in Table 1 and the irradiation of the coating surface by ultraviolet rays (Lamp: H2000L/6,Toshiba Denzai Co., Ltd.) after heating and embossing the coating.

The evaluation of the properties of the coatings described in the Examples are summarized in Table 3.

COMPARATIVE EXAMPLES

Comparative Example 1 was produced according to the same procedure as Example 1, except for the substitution of the composite polyvinylchloride plastisol composition shown in Table 2.

Comparative Example 2 was performed according to Japanese Laid-Open Patent Application No. Sho.

54-50549 and was produced by the same procedure as Example 1, except for the substitution of the composite polyvinylchloride plastisol composition shown in Table 2.

Comparative Examples 3 and 5 were also produced by the same procedure as Example 1, except for the substitution of the composite polyvinylchloride plastisol compositions shown in Table 2.

Comparative Example 4 was performed according to Japanese Laid-Open Patent Application No. Sho. 63-185630 and was produced by the same procedure as Example 2, except for the substitution of the compositive polyvinylchloride plastisol composition shown in Table 2.

The evaluation of the properties of the Comparative Examples are summarized in Table 3.

As mentioned in Table 3, the composite polyvinylchloride plastisol coated steel sheet according to the present invention has a coating of high hardness and shows excellent formability, embossing finish, impression resistance and bleed resistance.

The polyvinylchloride powders and acrylic resin powders used in the Examples and Comparative Examples are described in detail as followed:

PVC A : polyvinylchloride powder
  average degree of polymerization(P); 1,650
  distribution in particle size;
    0.5 to 5 μm: 30 wt %
    5 to 40 μm: 70 wt %
  2 peaks distribution curve; 2 μm and 10 μm
PVC B: polyvinylchloride-vinylacetate powder; vinylacetate 5 wt %
  average degree of polymerization (P); 1,300
  distribution in particle size;
    0.5 to 5 μm: 45 wt %
    5 to 40 μm: 55 wt %
  2 peaks distribution curve; 2 μm and 10 μm
Acrylic resin A: polymethylmethacrylate powder
  average degree of polymerization(P); 20,000
  distribution in particle size;
    0.5 to 5 μm: 95 wt %
Acrylic resin B: polymethylmethacrylate powder
  average degree of polymerization(P); 7,000
  distribution in particle size;
    3 to 20 μm: 95 wt %
Acrylic resin C: cross-linked polymethylmethacrylate powder
  distribution in particle size;
    3 to 30 μm: 95 wt %

The polyvinylchloride coated steel sheets, which were prepared in Examples 1-6 and Comparative Examples 1-5, were evaluated by the following test methods. The results are shown in Table 3.

(1) Viscosity of the polyvinylchloride plastisol was measured by a BM-type viscotester (Tokyo Keiki Co., Ltd.).

(2) Hardness of the coating was measured by a A-type duro meter (Shimadzu Co., Ltd).

(3) Formability of the polyvinylchloride coated steel sheet.

A sample steel sheet was subjected to the Dupont impact test ($\frac{1}{2}'' \times 1$ kg $\times 50$ cm) at temperatures of $-5°$ C., $0°$ C. and $5°$ C. The sheets were evaluated and the following symbols are used to describe the results of the test.

O: no cracking in the coating at $-5°$ C.
Δ: cracking at $-5°$ C. and no cracking at $0°$ C. and $5°$ C.
X: cracking at $-5°$ C., $0°$ C. and $5°$ C.

(4) Glossiness of the coating $60°$ specular glossiness was measured by a glossimeter UGX-5 (Suga Test Instruments Co., Ltd.)

(5) Embossing of the coating

A sample steel sheet was subjected to the surface roughness tester Surfcom 60A (Tokyo Seimitsu Co., Ltd.), and average roughness (Ra) and maximum roughness (Rmax) were shown.

(6) Impression resistance

Sample steel sheets, $15 \times 15$ cm in size, were piled up and were subjected to the load test ($40°$ C. $\times 3$ kg/cm$^2 \times 10$ day). After that, the embossing pattern of the coating was evaluated.

O : nothing unusual on the embossing pattern
Δ: embossing pattern is partially deformed
X: embossing pattern is deformed heavily (7) Bleed resistance Sample steel sheets and polyester films of 20μm in thickness, $15 \times 15$ cm in size, were piled up one after another and were subjected to the load test ($50°$ C. $\times 10$ kg/cm$^2 \times 10$ day). After that, bleeded materials on the polyester film surface from the coating were observed.

O: no bleeding
Δ: slight bleeding
X: heavy bleeding

TABLE 1

| Example | Plastisol composition | (Parts) | Plastisol viscosity (Poise) |
|---|---|---|---|
| 1 | PVC A | 87 | 260 |
|   | Acrylic resin A | 13 |   |
|   | Acrylic oligomer(Aronix M-8060, Toagosei Co., Ltd.) | 15 |   |
|   | Organic peroxide(Perhexsa 3M,Nipponushi Co., Ltd.) | 0.3 |   |
|   | Plasticizer (DOP) | 30 |   |
|   | Plasticizer (CS-16,Chisso Co.,Ltd.) | 10 |   |
|   | Stabilizer(Pb-type) | 2 |   |
|   | Pigment (Carbon black) | 1.5 |   |
| 2 | PVC A | 91 | 250 |
|   | Acrylic resin A | 9 |   |
|   | Acrylic oligomer(Aronix M-8060, Toagosei Co., Ltd.) | 15 |   |
|   | Photoinitiator (Darocure No.1116, Merk Co., Ltd.) | 0.45 |   |
|   | Plasticizer (DOP) | 30 |   |
|   | Plasticizer (CS-16,Chisso Co.,Ltd.) | 10 |   |
|   | Stabilizer(Pb-type) | 2 |   |
|   | Pigment (Carbon black) | 1.5 |   |
| 3 | PVC A | 80 | 260 |
|   | Acrylic resin A | 20 |   |
|   | Acrylic monomer (TMPT, Shinnakamura Chemical Co., Ltd.) | 10 |   |
|   | Photoinitiator (Darocure No.1116, Merk Co., Ltd.) | 0.35 |   |
|   | Organic peroxide(Perhexsa 3M,Nipponushi Co., Ltd.) | 0.05 |   |
|   | Plasticizer (DOP) | 30 |   |
|   | Plasticizer (CS-16,Chisso Co.,Ltd.) | 10 |   |
|   | Stabilizer(Pb-type) | 2 |   |
|   | Pigment (Carbon black) | 1.5 |   |
| 4 | PVC A | 77 | 250 |
|   | Acrylic resin B | 23 |   |
|   | Acrylic oligomer(Aronix M-400, Toagosei Co., Ltd.) | 15 |   |
|   | Photoinitiator (Darocure No.1116, Merk Co., Ltd.) | 0.45 |   |
|   | Plasticizer (DOP) | 30 |   |
|   | Plasticizer (CS-16,Chisso Co.,Ltd.) | 10 |   |
|   | Stabilizer(Pb-type) | 2 |   |
|   | Pigment (Carbon black) | 1.5 |   |
| 5 | PVC A | 77 | 200 |
|   | Acrylic resin C | 23 |   |
|   | Acrylic oligomer(Aronix M-400, | 15 |   |

TABLE 1-continued

| Example | Plastisol composition | (Parts) | Plastisol viscosity (Poise) |
|---|---|---|---|
| | Toagosei Co., Ltd.) | | |
| | Photoinitiator (Darocure No.1116, Merk Co., Ltd.) | 0.45 | |
| | Plasticizer (DOP) | 30 | |
| | Plasticizer (CS-16,Chisso Co.,Ltd.) | 10 | |
| | Stabilizer(Pb-type) | 2 | |
| | Pigment (Carbon black) | 1.5 | |
| 6 | PVC B | 77 | 300 |
| | Acrylic resin A | 23 | |
| | Acrylic oligomer(Aronix M-8060, Toagosei Co., Ltd.) | 15 | |
| | Photoinitiator (Darocure No.1116, Merk Co., Ltd.) | 0.45 | |
| | Plasticizer (DOP) | 45 | |
| | Stabilizer(Organic Sn compound) | 2 | |
| | Pigment (Titanium white) | 5 | |

TABLE 2

| Comparative Example | Plastisol composition | (Parts) | Plastisol viscosity (Poise) |
|---|---|---|---|
| 1 | PVC A | 100 | 300 |
| | Plasticizer (DOP) | 30 | |
| | Plasticizer (CS-16,Chisso Co., Ltd.) | 15 | |
| | Stabilizer(Pb-type) | 2 | |
| | Pigment (Carbon black) | 1.5 | |
| 2 | PVC A | 100 | 280 |
| | Acrylic oligomer(Aronix M-8060, Toagosei Co., Ltd.) | 15 | |
| | Photoinitiator (Darocure No.1116, Merk Co.,Ltd.) | 0.60 | |
| | Plasticizer (DOP) | 35 | |
| | Stabilizer(Pb-type) | 2 | |
| | Pigment (Carbon black) | 1.5 | |
| 3 | PVC A | 100 | 260 |
| | Acrylic monomer(TMPT, Shinnakamura Chemical Co.,Ltd.) | 20 | |
| | Organic peroxide(Perhexsa 3M, Nipponushi Co.,Ltd.) | 0.6 | |
| | Plasticizer (DOP) | 30 | |
| | Stabilizer(Pb-type) | 2 | |
| | Pigment (Carbon black) | 1.5 | |
| 4 | PVC A | 80 | 290 |
| | Acrylic resin A | 20 | |
| | Plasticizer (DOP) | 30 | |
| | Plasticizer (CS-16,Chisso Co., Ltd.) | 10 | |
| | Stabilizer(Pb-type) | 2 | |
| | Pigment (Carbon black) | 1.5 | |
| 5 | PVC B | 100 | 330 |
| | Plasticizer (DOP) | 45 | |
| | Stabilizer(Organic Sn compound) | 2 | |
| | Pigment (Titanium white) | 5 | |

TABLE 3

| Sample No. | Film Hardness (Duro A) | Form-ability | Gloss | Embossing Ra(mm) | Embossing Rmax(mm) | Impression resistance | Bleed resistance |
|---|---|---|---|---|---|---|---|
| Example | | | | | | | |
| 1 | 94 | O | 6 | 3.3 | 29.6 | O | O |
| 2 | 95 | O | 6 | 3.5 | 30.5 | O | O |
| 3 | 97 | Δ | 5 | 3.3 | 29.5 | O | O |
| 4 | 95 | O | 7 | 3.6 | 31.5 | O | O |
| 5 | 92 | O | 4 | 3.8 | 35.6 | O | O |
| 6 | 87 | O | 10 | 3.6 | 32.5 | O | O |
| Comparative Example | | | | | | | |
| 1 | 90 | Δ | 10 | 3.5 | 30.3 | X | X |
| 2 | 92 | X | 12 | 3.4 | 30.0 | X | Δ |
| 3 | 91 | X | 11 | 1.7 | 17.5 | X | Δ |
| 4 | 92 | O | 6 | 2.6 | 26.5 | Δ | Δ |
| 5 | 76 | O | 13 | 3.7 | 32.7 | X | X |

What we claim is:

1. A method of applying a composite polyvinylchloride coating to a metal sheet, comprising:
    applying a coating of a composite polyvinylchloride plastisol to a metal sheet, said composite polyvinylchloride plastisol comprising,
    100 parts by weight of a polyvinylchloride powder of which more than 95 weight percent is composed of particles whose sizes are in the range of 0.5 to 40 μm, and wherein of that, 20 to 60 weight percent is composed of particles in the range of 0.5 to 5 μm and 35 to 75 weight percent is composed of particles in the range of 5 to 40 μm, so that a distribution curve of particle sizes shows 2 peaks in the ranges of 1 to 3 μm and 8 to 15 μm,
    5 to 60 parts by weight of an acrylic resin powder having an average degree of polymerization of 500 to 30,000 and having particle sizes of more than 0.1 μm and less than 40 μm,
    5 to 60 parts by weight of an acrylic monomer, an acrylic oligomer or a mixture thereof, which monomers or oligomers have at least one functional group, and
    at least one heat setting initiator or photoinitiator,
    whereby a composite polyvinylchloride coated metal sheet is obtained; and,
    heating the composite polyvinylchloride coated metal sheet at 150° to 250° C. so as to obtain a composite polyvinylchloride coated metal sheet.

2. A method according to claim 1, wherein the composite polyvinylchloride plastisol contains at least one plasticizer, stabilizer or pigment.

3. A method according to claim 1, wherein the functional group of the acrylic monomer or acrylic oligomer is acryloyl, methacryloyl or vinyl.

4. A method according to claim 1, wherein the metal sheet is precoated with an adhesive prior to coating the metal sheet with the composite polyvinylchloride plastisol.

5. A method of applying a composite polyvinylchloride coating to a metal sheet, comprising:

applying a coating of a composite polyvinylchloride plastisol to a metal sheet, said composite polyvinylchloride plastisol comprising, 100 parts by weight of a polyvinylchloride powder of which more than 95 weight percent is composed of particles whose sizes are in the range of 0.5 to 40 μm, and wherein of that, 20 to 60 weight percent is composed of particles in the range of 0.5 to 5 μm and 35 to 75 weight percent is composed of particles in the range of 5 to 40 μm, so that a distribution curve of particle sizes shows 2 peaks in the ranges of 1 to 3 μm and 8 to 15 μm, 5 to 60 parts by weight of an acrylic resin powder having an average degree of polymerization of 500 to 30,000 and having particle sizes of more than 0.1 μm and less than 40 μm, 5 to 60 parts by weight of an acrylic monomer, an acrylic oligomer or a mixture thereof, which monomers or oligomers have at least one functional group, and at least one heat setting initiator on photoinitiator, whereby a composite polyvinylchloride coated metal sheet is obtained;

heating the composite polyvinylchloride coated metal sheet at 150° to 250° C. so as to obtain a composite polyvinylchloride coated metal sheet;

embossing the coated metal sheet to obtain an embossed coated metal sheet; and, irradiating the embossed coated metal sheet with rays of an ultraviolet wavelength.

6. A method according to claim 5, wherein the composite polyvinylchloride plastisol contains at least one plasticizer, stabilizer or pigment.

7. A method according to claim 5, wherein the functional group of the acrylic monomer or acrylic oligomer is acryloyl, methacryloyl or vinyl.

8. A method according to claim 5, wherein the metal sheet is precoated with an adhesive prior to coating the metal sheet with the composite polyvinylchloride plastisol.

9. A composite polyvinylchloride plastisol for coating a metal sheet, said composite polyvinylchloride plastisol comprising:

100 parts by weight of a polyvinylchloride powder of which more than 95 weight percent is composed of particles whose sizes are in the range of 0.5 to 40 μm, and wherein of that, 20 to 60 weight percent is composed of particles in the range of 0.5 to 5 μm and 35 to 75 weight percent is composed of particles in the range of 5 to 40 μm, so that a distribution curve of particle sizes shows 2 peaks in the ranges of 1 to 3 μm and 8 to 15 μm, 5 to 60 parts by weight of an acrylic resin powder having an average degree of polymerization of 500 to 30,000 and having particle sizes of more than 0.1 μm and less than 40 μm, 5 to 60 parts by weight of an acrylic monomer, an acrylic oligomer or a mixture thereof, which monomers or oligomers have at least one functional group, and at least one heat setting initiator or photoinitiator.

10. A composite polyvinylchloride plastisol according to claim 9, wherein the composite polyvinylchloride plastisol contains at least one plasticizer, stabilizer or pigment.

11. A composite polyvinylchloride plastisol according to claim 9, wherein the functional group of the acrylic monomer or acrylic oligomer is acryloyl, methacryloyl, or vinyl.

* * * * *

UNITED STATES PATENT AND TRADEMARK OFFICE
CERTIFICATE OF CORRECTION

PATENT NO. : 4,929,171
DATED : May 29, 1990
INVENTOR(S) : Yoshio HAYASHI ET AL.

It is certified that error appears in the above-identified patent and that said Letters Patent is hereby corrected as shown below:

Column 3, line 45, appearing from the line numbers in the center margin as line 46, change "benzoin benzyl" to -- benzoin, benzyl --.

Column 8, line 53, corresponding to line 23 of claim 1, delete "or photoinitiator".

Column 9, line 24, corresponding to line 23 of claim 5, change "on" to -- or --.

Signed and Sealed this

Fourth Day of May, 1993

Attest:

MICHAEL K. KIRK

Attesting Officer

Acting Commissioner of Patents and Trademarks